(12) United States Patent
Park et al.

(10) Patent No.: US 9,554,381 B2
(45) Date of Patent: Jan. 24, 2017

(54) METHOD AND APPARATUS FOR TRANSMITTING OR RECEIVING AN ADDITIONAL DEMODULATION REFERENCE SIGNAL BASED ON A CHANNEL STATE INFORMATION REFERENCE SIGNAL RESOURCE PATTERN

(71) Applicant: LG ELECTRONICS INC., Seoul (KR)

(72) Inventors: Hanjun Park, Anyang-si (KR); Kijun Kim, Anyang-si (KR); Jonghyun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/430,472

(22) PCT Filed: Sep. 24, 2013

(86) PCT No.: PCT/KR2013/008520
§ 371 (c)(1),
(2) Date: Mar. 23, 2015

(87) PCT Pub. No.: WO2014/046516
PCT Pub. Date: Mar. 27, 2014

(65) Prior Publication Data
US 2015/0271814 A1    Sep. 24, 2015

Related U.S. Application Data

(60) Provisional application No. 61/704,569, filed on Sep. 24, 2012.

(51) Int. Cl.
*H04W 4/00* (2009.01)
*H04W 72/04* (2009.01)
(Continued)

(52) U.S. Cl.
CPC ........... *H04W 72/0446* (2013.01); *H04B 7/04* (2013.01); *H04L 5/0026* (2013.01); *H04L 5/0048* (2013.01);
(Continued)

(58) Field of Classification Search
CPC ... H04W 72/0446; H04W 72/042; H04B 7/04; H04L 5/0026; H04L 72/26
See application file for complete search history.

(56) References Cited

U.S. PATENT DOCUMENTS

2011/0158351 A1* 6/2011 Gorokhov ............ H04B 7/0417
375/316
2013/0064216 A1* 3/2013 Gao ....................... H04L 5/0016
370/330

(Continued)

OTHER PUBLICATIONS

New Postcom, "Association between DMRS ports and ePDCCH transmission", 3GPP TSG RAN WG1 Meeting #70, Qingdao, China, Aug. 13-17, 2012, R1-123430, 3 pages.

(Continued)

*Primary Examiner* — Abdelnabi O Musa
(74) *Attorney, Agent, or Firm* — Birch, Stewart, Kolasch & Birch, LLP

(57) ABSTRACT

A method for transmitting a second demodulation reference signal added to support an additional antenna port (referred to as a "second antenna" hereinafter) in a downlink subframe having an extended cyclic prefix (CP), in which a resource (referred to as a "first resource pattern" hereinafter) to which a first demodulation reference signal will be mapped is configured, through a predetermined number of antenna ports (referred to as a "first antenna" hereinafter) in a wireless communication system includes: specifying positions of resources to which a channel state information reference signal (CSI-RS) is mapped in subframe(s) in which the CSI-RS is not transmitted and a subframe in (Continued)

which the CSI-RS is transmitted on the basis of CSI-RS configuration information; selecting a resource (referred to as a "second resource pattern" hereinafter) to which the second demodulation reference signal will be mapped from resources of the subframe(s) in which the CSI-RS is not transmitted, the resources corresponding to the positions of the resources to which the CSI-RS is mapped; and mapping the second demodulation reference signal to the second resource pattern.

11 Claims, 16 Drawing Sheets

(51) Int. Cl.
    *H04B 7/04*     (2006.01)
    *H04L 27/26*     (2006.01)
    *H04L 5/00*     (2006.01)

(52) U.S. Cl.
    CPC ............ *H04L 5/0082* (2013.01); *H04L 27/26* (2013.01); *H04W 72/042* (2013.01); *H04L 5/001* (2013.01); *H04L 5/0035* (2013.01)

(56) References Cited

U.S. PATENT DOCUMENTS

| | | | |
|---|---|---|---|
| 2013/0188558 A1* | 7/2013 | Nam | H04W 24/02 370/328 |
| 2013/0194931 A1* | 8/2013 | Lee | H04L 5/0053 370/241 |
| 2013/0215823 A1* | 8/2013 | Shin | H04L 5/001 370/328 |
| 2014/0036810 A1* | 2/2014 | Harrison | H04W 72/042 370/329 |
| 2014/0071934 A1* | 3/2014 | Frenne | H04L 5/001 370/330 |

OTHER PUBLICATIONS

Nokia et al., "Association between DM-RS ports and ePDCCH transmission", 3GPP TSG RAN WG1 Meeting #70, Qingdao, China, Aug. 13-17, 2012, R1-123654, 7 pages.

Panasonic, "Views on Remaining issues for CSI-RS configuration", 3GPP TSG RAN WG1 Meeting #70, Qingdao, China, Aug. 13-17, 2012, R1-123281, 2 pages.

Research in Motion, UK Limited, "On Detail of Association Between DMRS Port Assignment and E-PDCCH Transmission", 3GPP TSG RAN WG1 Meeting #70, Qingdao, China, Aug. 13-17, 2012, R1-123182, 4 pages.

* cited by examiner

FIG. 5
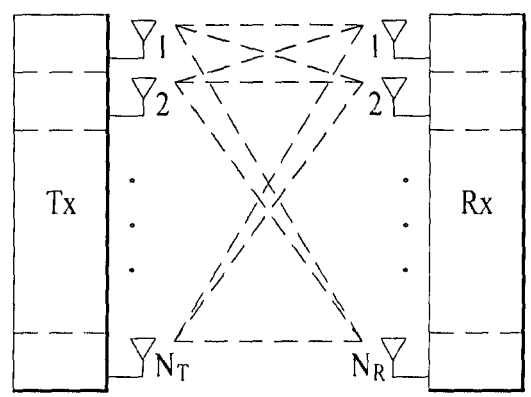
(a)
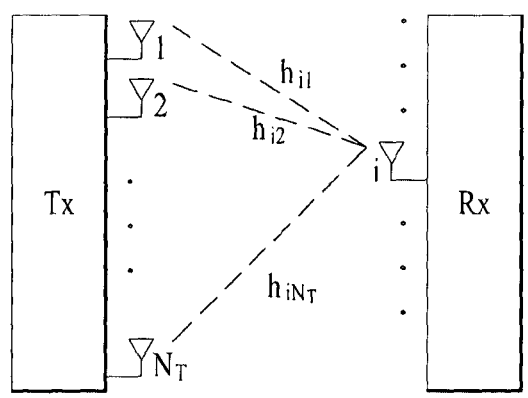
(b)

FIG. 7
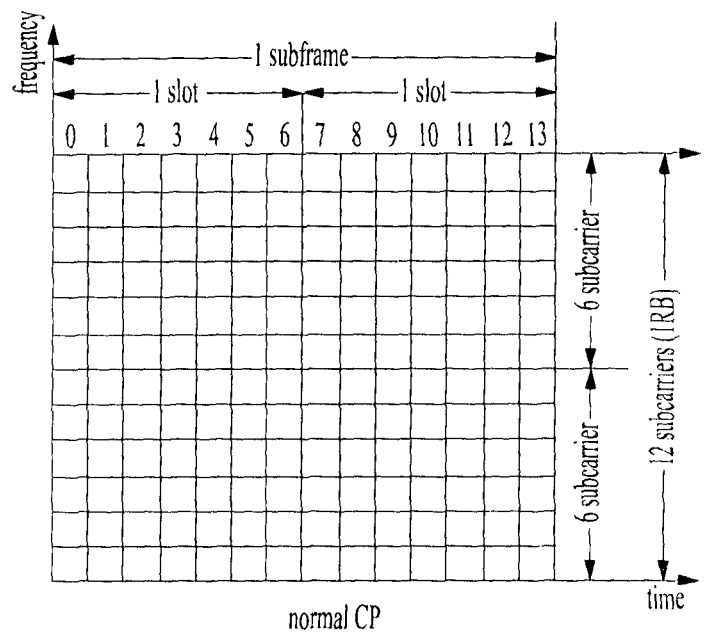
(a) normal CP
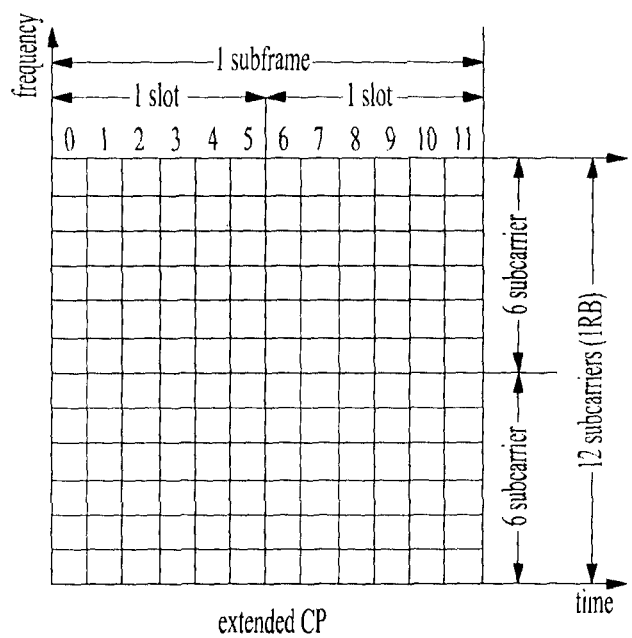
(b) extended CP

METHOD AND APPARATUS FOR TRANSMITTING OR RECEIVING AN ADDITIONAL DEMODULATION REFERENCE SIGNAL BASED ON A CHANNEL STATE INFORMATION REFERENCE SIGNAL RESOURCE PATTERN

CROSS REFERENCE TO RELATED APPLICATIONS

This application is the National Phase of PCT International Application No. PCT/KR2013/008520, filed on Sep. 24, 2013, which claims priority under 35 U.S.C. 119(e) to U.S. Provisional Application No. 61/704,569, filed on Sep. 24, 2012, all of which are hereby expressly incorporated by reference into the present application.

TECHNICAL FIELD

The present invention relates to a wireless communication system, and more specifically, to a method and apparatus for transmitting or receiving a reference signal.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide a method for allocating a resource for a reference signal in transmission of the reference signal.

Another object of the present invention is to provide a resource allocation method for a reference signal in a subframe to which an extended CP is applied in a massive MIMO environment.

The technical problems to be solved by the present invention are not limited to the above technical problems and those skilled in the art may understand other technical problems from the following description.

Technical Solution

The object of the present invention can be achieved by providing a method in a downlink subframe with an extended cyclic prefix (CP), in which a resource to which a first demodulation reference signal (referred to as a "first resource pattern" hereinafter) is mapped is configured, through a predetermined number of antenna ports (referred to as a "first antenna" hereinafter) in a wireless communication system, the method for transmitting a second demodulation reference signal added to support an additional antenna port (referred to as a "second antenna" hereinafter) the method including: specifying subframe(s) in which a channel state information reference signal CSI-RS is not transmitted and positions of resources to which the CSI-RS is mapped in subframe(s) in which the CSI-RS is transmitted based on CSI-RS configuration information;

selecting a resource to which the second demodulation reference signal is mapped (referred to as a "second resource pattern" hereinafter) from among resources of the subframe(s) in which the CSI-RS is not transmitted, the resources corresponding to the positions of the resources to which the CSI-RS is mapped; and mapping the second demodulation reference signal to the second resource pattern.

The method may further include transmitting the second resource pattern or CSI-RS configuration information indicating the second resource pattern to the UE.

The method may further include transmitting information on the number of antenna ports of the second antenna used to transmit the second demodulation reference signal to the UE.

The selecting of the second resource pattern may include selecting a resource having a subcarrier index different from a subcarrier index of a resource to which a cell-specific reference signal is allocated.

The mapping of the second demodulation reference signal may include applying a length-4 OCC to complex-valued modulation symbol(s) for the first demodulation reference signal and complex-valued modulation symbol(s) for the second demodulation reference signal in the direction of the time domain.

The second resource pattern may be composed of as many resource elements as the number of resource elements constituting the first resource pattern.

The mapping of the second demodulation reference signal may include: dividing each of the first resource pattern and the second resource pattern into two (2) sub-patterns; and mapping a complex-valued modulation symbol for the first demodulation reference signal to the first sub-pattern of the first resource pattern, mapping a complex-valued modulation symbol for a third demodulation reference signal, transmitted through a third antenna having as many antenna ports as the number of antenna ports of the first antenna, to the second sub-pattern of the first resource pattern, mapping a complex-valued modulation symbol for the second demodulation reference signal to the first sub-pattern of the second resource pattern, and mapping a complex-valued modulation symbol for a fourth demodulation reference signal, transmitted through a fourth antenna having as many antenna ports as the number of antenna ports of the second antenna, to the second sub-pattern of the second resource pattern, wherein the first resource pattern is divided into the two (2) sub-patterns such that the two (2) sub-patterns have the same frequency domain density and the second resource pattern is divided into the two (2) sub-patterns such that the two (2) sub-patterns have the same frequency domain density.

The second resource pattern includes at least one of RE pairs positioned at (3x+k', 4) and (3x+k', 5) in each slot of a physical resource block (PRB) pair in the subframe, wherein x=0, 1, 2 and 3, k'=0 or 2 if $n_s$ mod 2=0, or 1 if $n_s$ mod 2=1, $n_s$ denotes a slot index, and (m, n)=(subcarrier index, OFDM symbol index) in each slot of the PRB pair.

In another aspect of the present invention, provided herein is a method in a downlink subframe with an extended CP, in which a resource to which a first demodulation reference signal is mapped (referred to as a "first resource pattern" hereinafter) is configured, through a predetermined number of antenna ports (referred to as a "first antenna" hereinafter) in a wireless communication system, the method for receiving a second demodulation reference signal added to support an additional antenna port (referred to as a "second antenna" hereinafter) and including: receiving the second demodulation reference signal in a resource for the second demodulation reference signal (referred to as a "second resource pattern" hereinafter), selected from resources in subframe(s) in which a CSI-RS is not transmitted, the resources corresponding to positions of resources to which the CSI-RS is mapped in subframe(s) in which the CSI-RS is transmitted, wherein the subframe(s) in which a CSI-RS is not transmitted and the positions of the resources to which the CSI-RS is mapped are specified based on CSI-RS configuration information.

In another aspect of the present invention, provided herein is an eNB in a downlink subframe with an extended CP, in which a resource to which a first demodulation reference signal is mapped (referred to as a "first resource pattern" hereinafter) is configured, through a predetermined number of antenna ports (referred to as a "first antenna" hereinafter) in a wireless communication system, the eNB configured to transmit a second demodulation reference signal added to support an additional antenna port (referred to as a "second antenna" hereinafter) and including: a radio frequency (RF) unit; and a processor configured to control the RF unit, wherein the processor is configured to specify subframe(s) in which a channel state information reference signal (CSI-RS) is not transmitted and positions of resources to which the CSI-RS is mapped in subframe(s) in which the CSI-RS is transmitted based on CSI-RS configuration information, to select a resource to which the second demodulation reference signal is mapped (referred to as a "second resource pattern" hereinafter) from among resources of the subframe(s) in which the CSI-RS is not transmitted, the resources corresponding to the positions of the resources to which the CSI-RS is mapped, and to map the second demodulation reference signal to the second resource pattern.

In another aspect of the present invention, provided herein is a UE in a downlink subframe with an extended CP, in which a resource to which a first demodulation reference signal is mapped (referred to as a "first resource pattern" hereinafter) is configured, through a predetermined number of antenna ports (referred to as a "first antenna" hereinafter) in a wireless communication system, the UE configured to receive a second demodulation reference signal added to support an additional antenna port (referred to as a "second antenna" hereinafter) and including: an RF unit; and a processor configured to control the RF unit, wherein the processor is configured to receive the second demodulation reference signal in a resource for the second demodulation reference signal (referred to as a "second resource pattern" hereinafter), selected from resources in subframe(s) in which a channel state information reference signal (CSI-RS) is not transmitted, the resources corresponding to positions of resources to which the CSI-RS is mapped in subframe(s) in which the CSI-RS is transmitted, wherein the subframe(s) in which the CSI-RS is not transmitted and the positions of the resources to which the CSI-RS is mapped are specified based on CSI-RS configuration information in the subframe(s).

The above description and the following detailed description of the present invention are exemplary and are for the purpose of additional explanation of the claims.

Advantageous Effects

According to an embodiment of the present invention, demodulation/decoding performance of a UE can be improved through reference signal allocation.

In addition, according to an embodiment of the present invention, a reference signal can be transmitted in a subframe in which reference signal transmission is limited and an extended CP is applied through multiple antenna ports, thereby supporting a massive MIMO system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a MIMO (Multi-Input Multi-Output) system used in 3GPP LTE/LTE-A;

FIG. 7 illustrates a subframe structure used in 3GPP LTE/LTE-A;

BEST MODE

Figure 1:
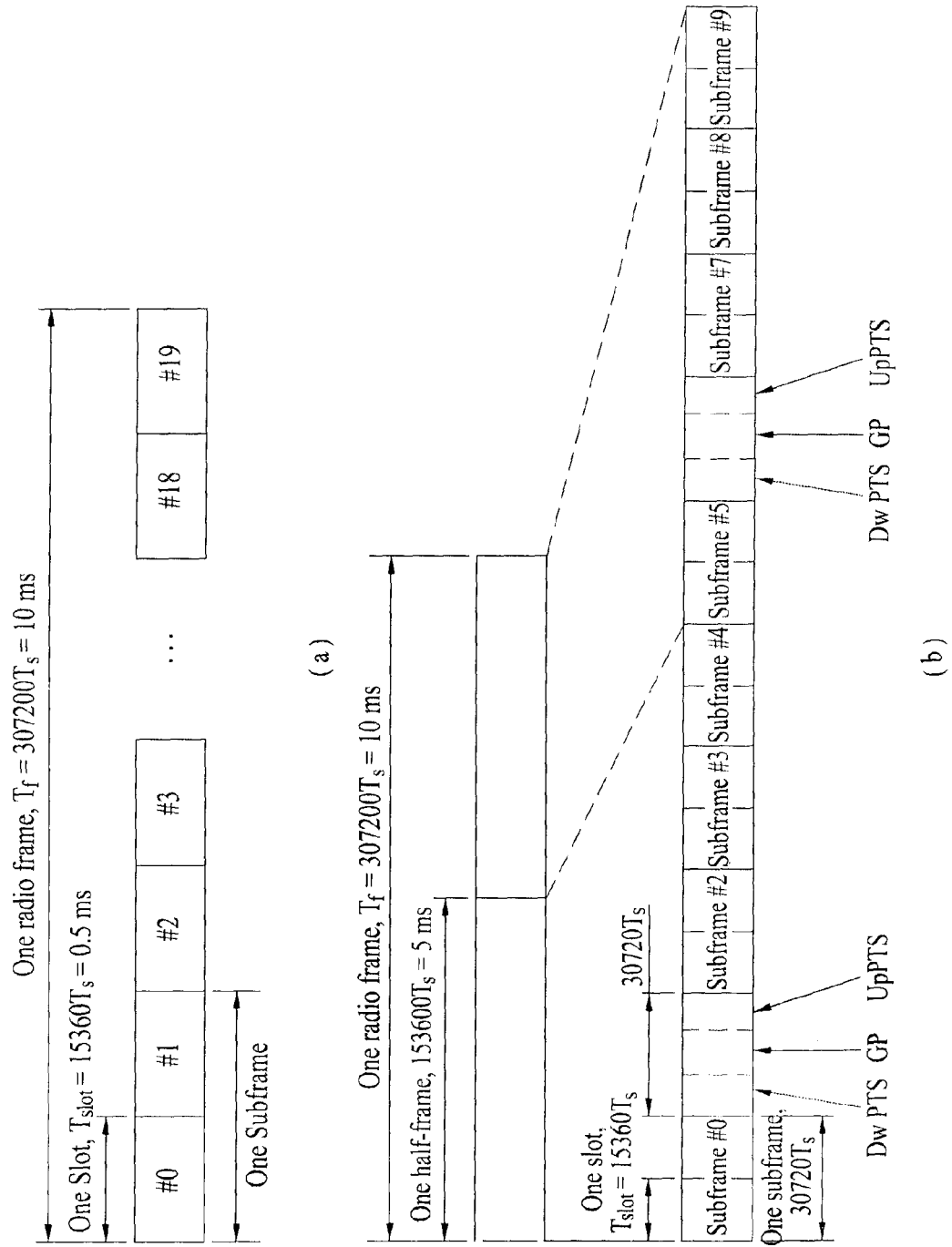
FIG. 1 illustrates an exemplary radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS ee | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
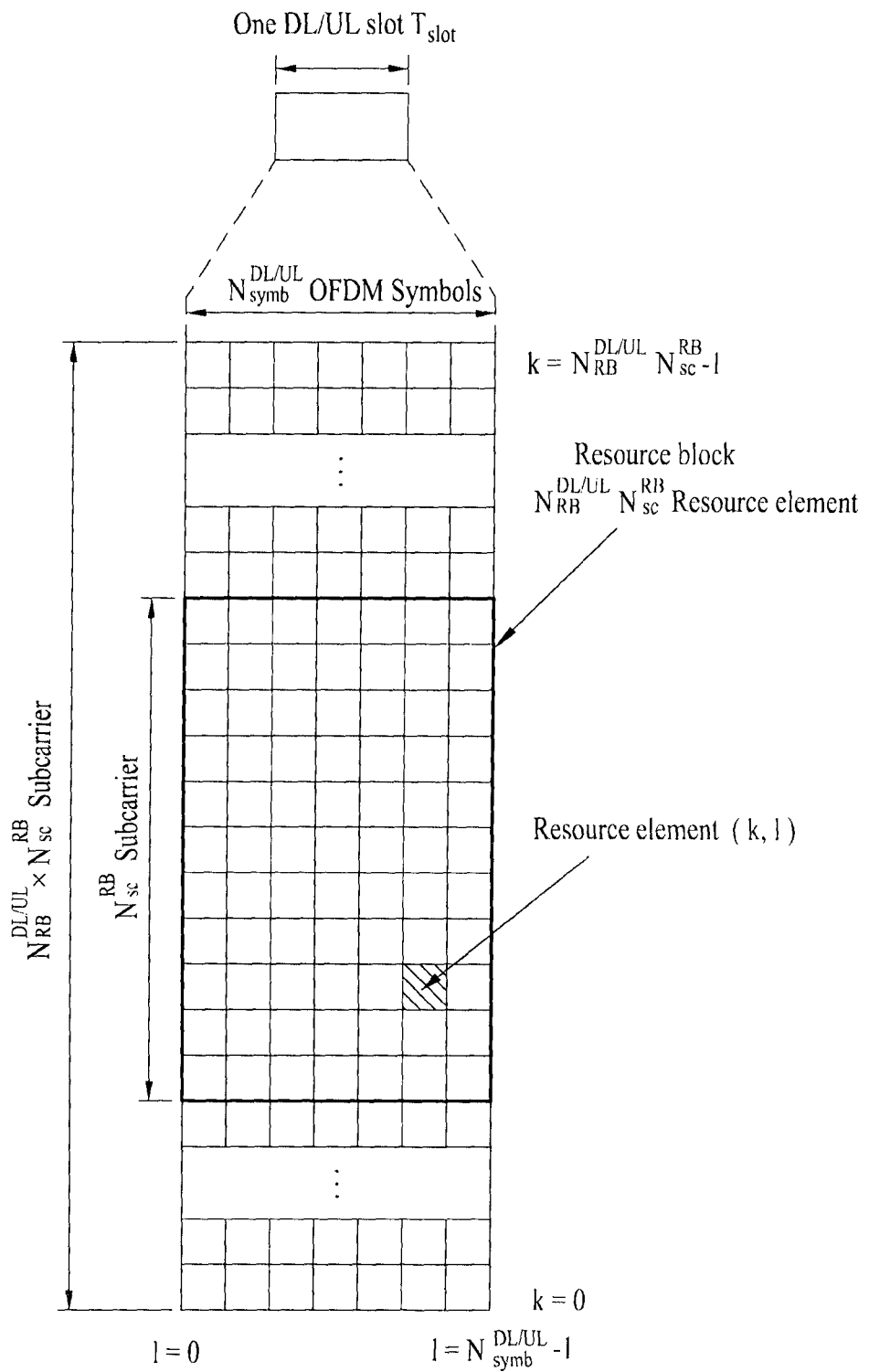
FIG. 2 illustrates an exemplary downlink/uplink (DL/UL) slot structure used in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
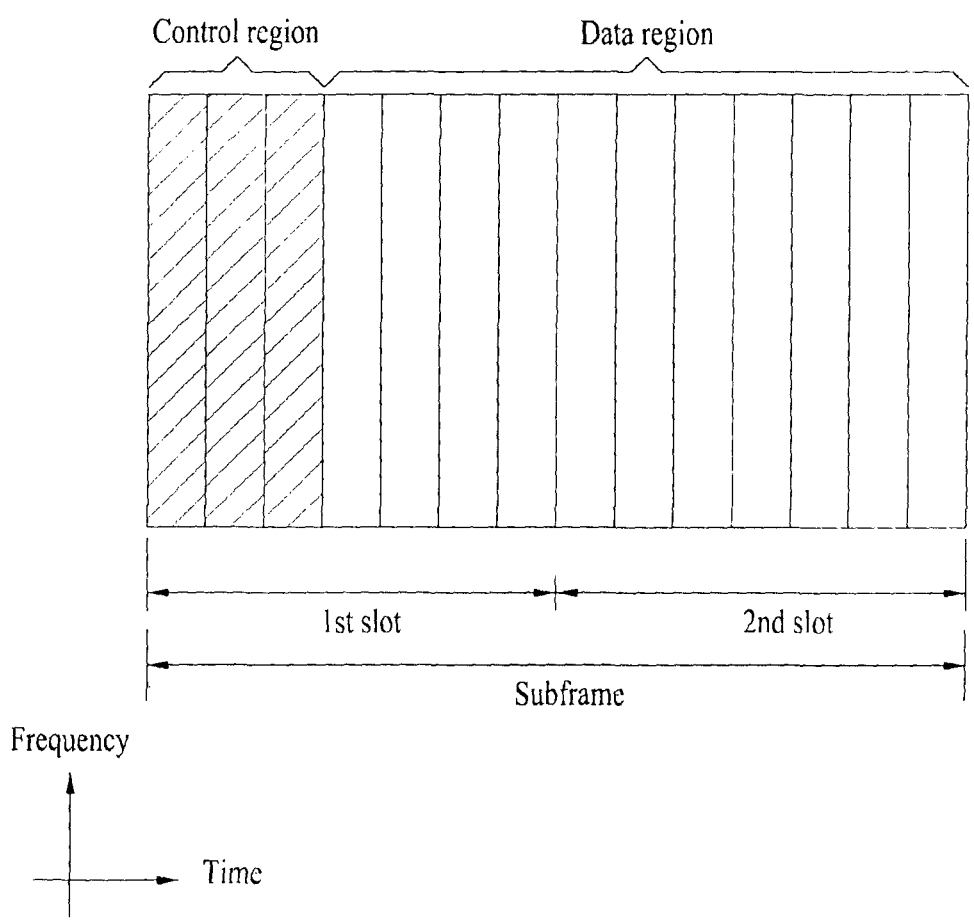
FIG. 3 illustrates an exemplary downlink subframe structure used in 3GPP LTE/LTE-A.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
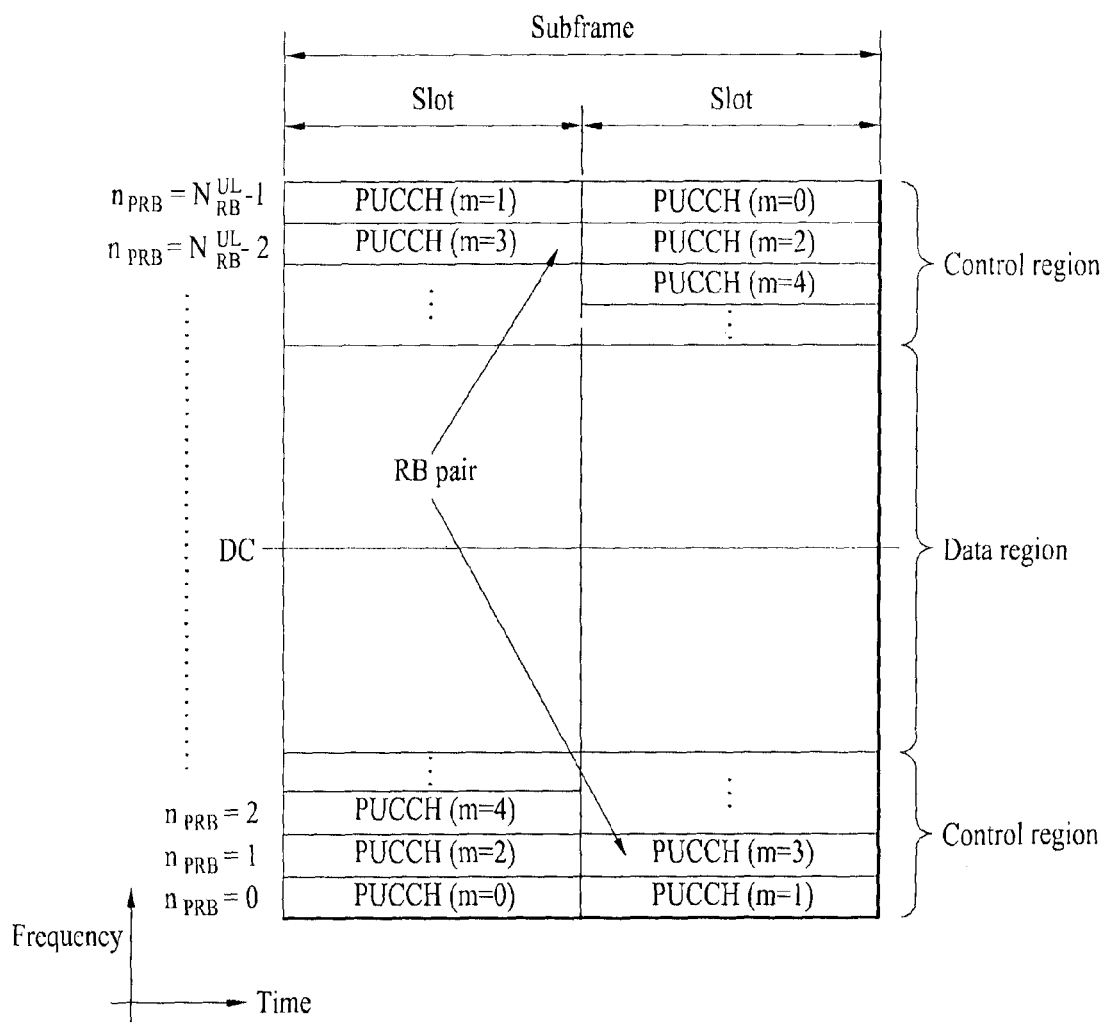
FIG. 4 illustrates an exemplary uplink subframe structure used in 3GPP LTE/LTE-A.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels)

can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. 1 HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |

TABLE 3-continued

| PUCCH format | Modulation scheme | Number of bits per subframe, $M_{bit}$ | Usage | Etc. |
|---|---|---|---|---|
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

FIG. 5 illustrates configurations of wireless communication systems including multiple antennas.

Referring to FIG. 5(a), when the number of Tx antennas and the number of Rx antennas are respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. It is assumed that $N_T$ Tx antennas and $N_R$ Rx antennas exist.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P s_1, P s_2, \ldots, P s_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5. Herein, $w_{ij}$ denotes a weight between an ith Tx antenna and a jth piece of information. W is called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \vdots \\ w_{i2} & w_{i2} & \cdots & w_{iN_T} \\ \vdots & & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$
$$= WPs$$

[Equation 5]

Here, $w_{ij}$ denotes a weight between an i-th Tx antenna and j-th information. W is also called a precoding matrix.

Given NR Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a j-th Tx antenna and an i-th Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an i-th Rx antenna. The channels may be represented as vectors and matrices by grouping them. As illustrated in FIG. 5(b), channels from the $N_T$ Tx antennas to an i-th Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Actual channels experience the above channel matrix H and then are added with Additive white Gaussian noise (AWGN). The AWGN $n_1, n_2, \ldots, n_{N_R}$ added to the NR Rx antennas is given as the following vector.

$$n = [n_1, n_2, \ldots, n_{N_R}]^T \quad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix}$$

$$= \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

[Equation 10]

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

The rank of a matrix is defined as the smaller between the numbers of independent rows and columns. Accordingly, the rank of the matrix is not larger than the number of rows or columns. For example, the rank of the matrix H, rank(H) is limited as follows.

$$\text{rank}(H) \leq \min(N_T, N_R) \quad \text{[Equation 11]}$$

If the matrix is eigenvalue-decomposed, its rank may be defined as the number of non-zero eigenvalues. Similarly, in case of singular value decomposition (SVD), the rank may be defined as the number of non-zero singular values. Therefore, the rank of a channel matrix physically means the maximum number of different pieces of information that can be transmitted on given channels.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Massive MIMO

Wireless communication systems following LTE Rel-12 consider introduction of an active antenna system (AAS). AAS refers to a system configured such that each antenna includes an active element such as an amplifier, distinguished from a conventional passive antenna system in which an amplifier capable of adjusting the phase and amplitude of a signal is separated from an antenna. The AAS does not need a cable, a connector, other hardware devices, etc. to connect an amplifier to an antenna since an active antenna is used, and thus the AAS is efficient in terms of energy and cost. Particularly, since the AAS supports electronic beam control per antenna, the AAS enables enhanced MIMO capable of forming an accurate beam pattern or a 3D beam pattern in consideration of beam direction and beam width.

Massive MIMO having a plurality of input/output antennas and a multi-dimensional antenna structure is also considered owing to introduction of an enhanced antenna system such as AAS. For example, a two-dimensional antenna array enables active antennas of an AAS to generate a 3-dimensional beam pattern. When the 3-dimensional beam pattern is used, a transmit antenna can perform quasi-static or dynamic beam formation in the vertical direction as well as the horizontal direction of a beam. For example, an application of formation of a sector in the vertical direction can be considered. From the viewpoint of a receive antenna, a signal power increase due to an antenna array gain can be expected when a reception beam is formed using a large-scale receive antenna. Accordingly, an eNB can receive a signal transmitted from a UE through a plurality of antennas on uplink and the UE can set transmit power thereof to a very low level in consideration of the gain of the large-scale receive antenna in order to reduce the influence of interference.

Figure 6:
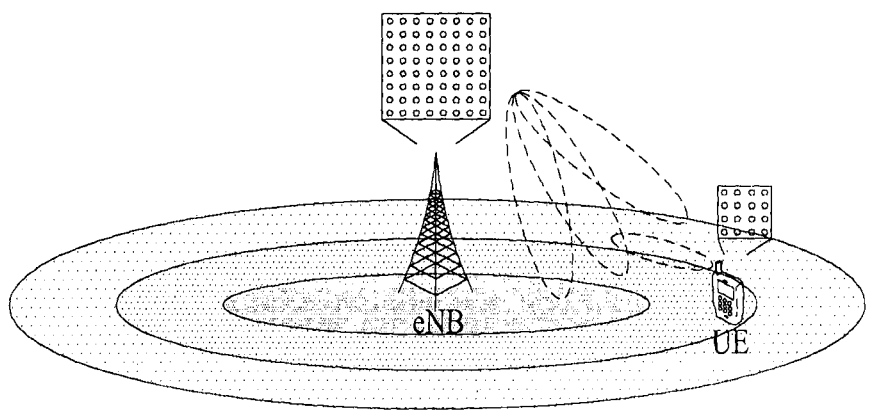
FIG. 6 illustrates a massive antenna based wireless communication system.

FIG. 6 illustrates a system in which an eNB or a UE has a plurality of transmit/receive antennas capable of forming an AAS based 3-dimensional beam.

The present invention proposes a method for increasing the number of antenna ports through which a DMRS is transmitted in a subframe to which an extended CP is applied in a massive MIMO wireless communication system. In addition, the present invention proposes a DMRS pattern in which DMRS density and REs for DMRS depending on the number of spatial layers are applied in order to increase the number of antenna ports for DMRS transmitted in a subframe to which the extended CP is applied.

3GPP LTE adopts orthogonal frequency division multiplexing (OFDM) that supports efficient operation of frequency resources based on orthogonal subcarriers. When OFDM symbols are sequentially transmitted in a radio channel environment, interference may be generated between OFDM symbols due to multi-path delay of a channel. LTE provides a CP in front of an OFDM symbol to avoid delay of signals of previously transmitted OFDM symbols in order to prevent interference between OFDM symbols. For validity of the CP, a CP length needs to be greater than channel delay spread. The channel delay spread may depend on an environment within which the corresponding network is installed. For example, the delay spread has a relatively small value in an environment having a small number of obstacles, whereas the delay spread has a relatively large value in an environment having a large number of obstacles. Accordingly, LTE defines a normal CP and an extended CP in consideration of the fact that channel delay spread depends on environment and applies the extended CP having a relatively long CP length to an environment having a relatively long delay spread. Here, as CP length increases, the length of an OFDM symbol carrying data is also increased in general in order to minimize inefficiency of time resources due to use of the CP. Accordingly, the number of OFDM symbols in a resource block (RB) depends on whether the normal CP or extended CP is applied because OFDM symbol length is increased when the extended CP is applied, as described above, and thus the number of OFDM symbols that can be included in a predetermined subframe decreases. FIG. 7 illustrates RB pairs for a normal CP and an extended CP in LTE.

When precoding is applied to a PDSCH region according to MIMO, LTE supports transmission of a DMRS to which the same precoding as that applied to the PDSCH region is applied such that a UE can perform efficient data demodulation without additional information regarding the precoding. For example, LTE Rel-8 can transmit a DMRS through antenna port #5 for a UE that receives data to which beamforming is applied and LTE Rel-9 can transmit a DMRS through antenna ports #7 and #8 discriminated from each other by a length-2 Walsh code, that is, an orthogonal cover code (OCC), to support dual layer transmission for a single UE or multi-user (MU) MIMO in which two UEs respectively use a single beam. In addition, LTE Rel-10 spreads a DMRS to support a maximum of 8 spatial layers. In LTE Rel-10, DMRSs are discriminated by an OCC having a length of 2 or 4 and a MIMO scheme using 8 spatial layers through a maximum of 8 antenna ports #7 to 14 is supported.

Figure 8:
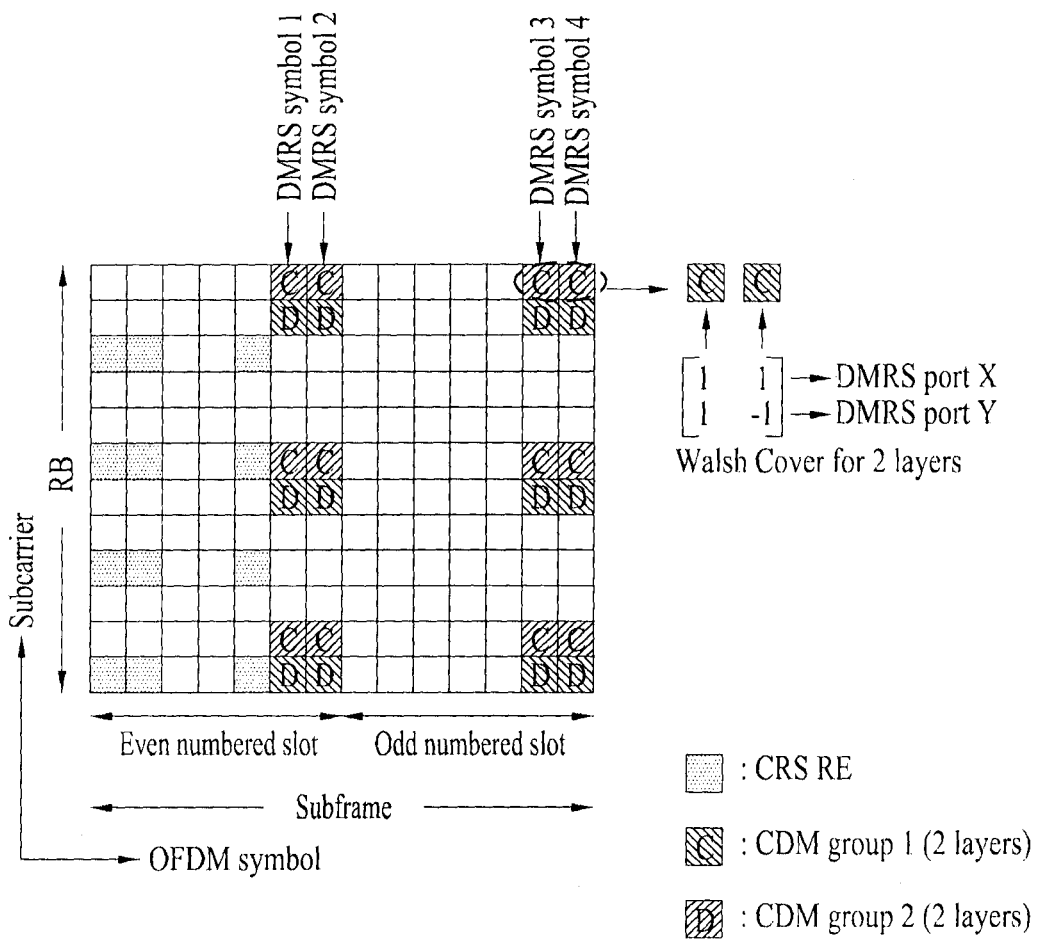
FIGS. 8 and 9 illustrate a time-frequency resource for a cell-specific reference signal (CRS) and a time-frequency resource for a demodulation reference signal (DMRS) in a resource block pair of a normal downlink subframe having a normal cyclic prefix (CP)
Figure 9:
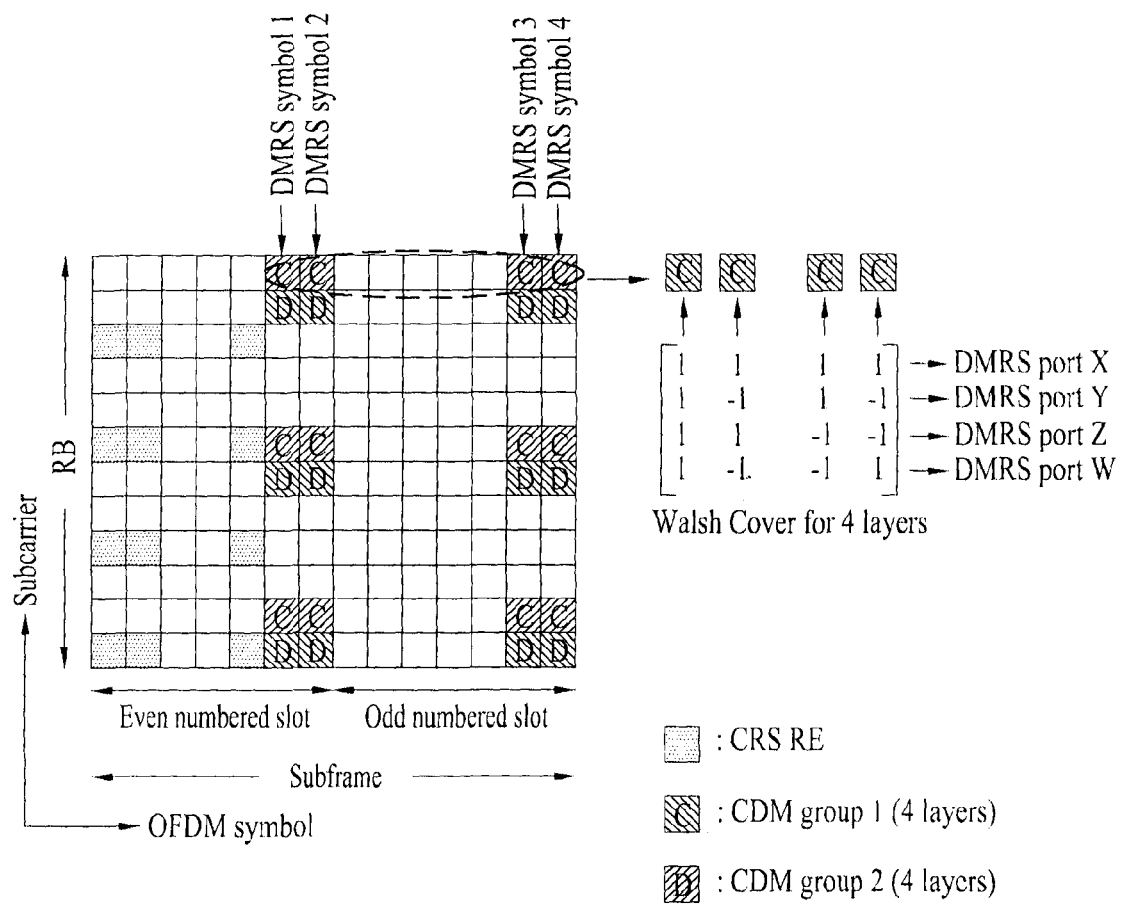

FIGS. 8 and 9 illustrate a time-frequency resource for a CRS and a time-frequency resource for a DMRS in an RB pair of a normal downlink subframe having the normal CP. Particularly, FIG. 8 illustrates a method for multiplexing a maximum of 4 DMRSs to 2 CDM groups and FIG. 9 illustrates a method for multiplexing a maximum of 8 DMRSs to 2 CDM groups.

Referring to FIGS. 8 and 9, in 3GPP LTE(-A), a DMRS is defined in a PRB pair. In the following description, a group of REs through which DMRSs that can be discriminated by being spread by an OCC are transmitted, from among REs of a PRB pair, is called a code division multiplexing (CDM) group. A Walsh-Hadamard code is an exemplary form of OCC. An OCC may also be referred to as an orthogonal sequence. Referring to FIGS. 8 and 9, REs denoted by 'C' belong to a CDM group (referred to as CDM group 1 hereinafter) and REs denoted by 'D' belong to another CDM group (referred to as CDM group 2 hereinafter).

In 3GPP LTE(-A), a plurality of layers is multiplexed in a downlink or uplink subframe and transmitted to a receiver. In the present invention, a layer refers to an input path of information transmitted by a transmitter and input to a layer precoder and is called a transport layer, a stream, a transport stream, a data stream, etc. Transmitted data is mapped to one or more layers. Accordingly, the data is transmitted from a transmitter to a receiver through one or more layers. In the case of multi-layer transmission, the transmitter transmits a DMRS per layer and the number of DMRSs increases in proportion to the number of transmitted layers.

A single layer and a single DMRS may be transmitted through a single antenna port. When the transmitter needs to transmit 8 layers, 4 antenna ports (e.g. antenna ports #7, #8, #11 and #13) can transmit 4 DMRSs using a CDM group and 4 other antenna ports (e.g. antenna ports #9, #10, #12 and #14) can transmit 4 DMRSs using another CDM group. Referring to FIG. 9, for example, DMRS port X, DMRS port Y, DMRS port Z and DMRS port W can respectively transmit 4 DMRSs spread by different orthogonal sequences using the same CDM group. The receiver can detect DMRSs from a signal received through 4 DMRS REs consecutive in the OFDM symbol direction using an orthogonal sequence used to multiplex a DMRS to the 4 DMRS REs.

4 other antenna ports can multiplex a corresponding DMRS to DMRS REs denoted as 'D', which belong to CDM group 2, using another orthogonal sequence and transmit 4 DMRSs, which is not shown in FIG. 9. The receiver detects the DMRSs in the same manner as in the case of CDM group 1, except that different orthogonal sequences are used.

When the extended CP is applied, however, it is expected that an environment to which the extended CP is applied has serious channel delay spread and thus it is difficult to support a plurality of spatial layers due to high channel frequency selectivity. In LTE Rel-10, a DMRS supports a maximum of 2 spatial layers in a subframe to which the extended CP is applied, and the DMRS is transmitted through antenna ports #7 and #8.

A DMRS can be transmitted in such a manner that a reference signal sequence r(m) generated according to the following equation is mapped to complex-valued modulation symbols $a_{k,l}^{(p)}$ according to another equation and transmitted.

$$r(m) = \frac{1}{\sqrt{2}}(1 - 2 \cdot c(2m)) - j\frac{1}{\sqrt{2}}(1 - 2 \cdot c(2m-1)),$$ [Equation 12]

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

In Equation 12, $N_{RB}^{max,DL}$ is the largest downlink bandwidth configuration, and may be denoted by an integer multiple of $N_{sc}^{RB}$. Here, a pseudo-random sequence c(i) may be defined by a length-31 Gold sequence. An output sequence c(n) (where n=0, 1, ..., $M_{PN}$−1) having a length of $M_{PN}$ is defined according to the following equation 13.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$ [Equation 13]

Here, $N_C$=1600 and a first m-sequence is initialized to $x_1(0)$=1, $x_1(n)$=0, n=1, 2, ..., 30. Initialization of a second m-sequence is represented by the following Equation 3 having a value depending on application of the sequence.

$$c_{init}=\sum_{i=0}^{30} x_2(i) \cdot 2^i$$ [Equation 14]

In Equation 12, a pseudo-random sequence generator is initialized to cinit at the beginning of each subframe according to the following Equation 4.

$$c_{init}=(\lfloor n_s/2 \rfloor+1) \cdot (2N_{ID}^{cell}+1) \cdot 2^{16}+n_{SCID}$$ [Equation 15]

In Equation 15, if $n_{SCID}$ is not specified, $n_{SCID}$ is set to zero. For PDSCH transmission on Antenna Port 7 or 8, $n_{SCID}$ is given by DCI format 2B or 2C related to PDSCH transmission. DCI format 2B is a DCI format for resource assignment for a PDSCH that uses a maximum of two antenna ports each having a DMRS, and DCI format 2C is a DCI format for resource assignment for a PDSCH that uses a maximum of 8 antenna ports each having a DMRS. In case of DCI format 2B, $n_{SCID}$ may be indicated by a scrambling ID field according to Table 4. In case of DCI format 2C, $n_{SCID}$ may be indicated by a scrambling ID field according to Table 5.

TABLE 4

| Scrambling identity field in DCI format 2B | $n_{SCID}$ |
| --- | --- |
| 0 | 0 |
| 1 | 1 |

TABLE 5

| One Codeword: Codeword 0 enabled Codeword 1 disabled | | One Codeword: Codeword 0 enabled Codeword 1 enabled | |
| --- | --- | --- | --- |
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

The reference signal sequence r(m) generated according to Equation 12 can be mapped to complex-valued modulation symbols $a_{k,l}^{(p)}$ for a downlink subframe having the extended CP according to the following equation.

$$a_{k,l}^{(p)} = w_p(l' \bmod 2) \cdot r(4 \cdot l' \cdot N_{RB}^{max,DL} + 4 \cdot n_{PRB} + m')$$ [Equation 16]

$$w_p(i) = \begin{cases} \bar{w}_p(i) & m' \bmod 2 = 0 \\ \bar{w}_p(1-i) & m' \bmod 2 = 1 \end{cases}$$

-continued $$k = 3m' + N_{sc}^{RB} n_{PRB} + k'$$

$$k' = \begin{cases} 1 & \text{if } n_s\text{mod}2 = 0 \text{ and } p \in \{7, 8\} \\ 2 & \text{if } n_s\text{mod}2 = 1 \text{ and } p \in \{7, 8\} \end{cases}$$

$$l = l'\text{mod}2 + 4$$

$$l' = \begin{cases} 0, 1 & \text{if } n_s\text{mod}2 = 0 \text{ and in a special} \\ & \text{subframe with configuration 1, 2, 3, 5 or 6} \\ 0, 1 & \text{if } n_s\text{mod}2 = 0 \text{ and not in a special subframe} \\ 2, 3 & \text{if } n_s\text{mod}2 = 1 \text{ and not in a special subframe} \end{cases}$$

$$m' = 0, 1, 2, 3$$

As can be seen from Equation 16, when the reference signal sequence is mapped to the complex-valued modulation symbols, an orthogonal sequence $\overline{w}_p(i)$ is applied according to antenna port, as shown in the following table.

TABLE 6

| Antenna port p | $[\overline{w}_p(0)\ \overline{w}_p(1)]$ |
|---|---|
| 7 | [+1 +1] |
| 8 | [−1 +1] |

Figure 10:
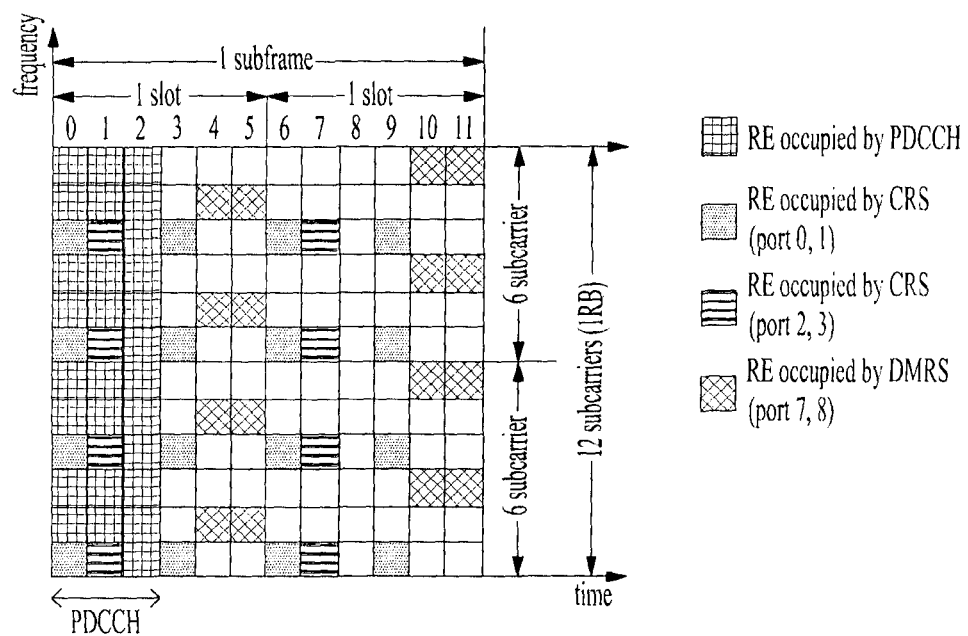
FIG. 10 illustrates a CRS pattern, a DMRS pattern and a PDCCH region of a downlink subframe having an extended CP.

FIG. 10 illustrates a DMRS pattern in a subframe to which the extended CP is applied.

In LTE Rel-10, DMRSs are transmitted through antenna ports #7 and #8 discriminated from each other by a length-2 OCC, as shown in FIG. 10. Here, a length-4 OCC is not considered because channel frequency selectivity is high in a subframe to which the extended CP is applied and thus only two or fewer spatial layers are supported. However, a larger number of spatial layers can be supported in an environment to which massive MIMO using nine or more antenna ports is introduced and utilization of a larger number of spatial layers can be advantageous in terms of performance improvement even though precoding error is allowed. Accordingly, it is necessary to increase the number of spatial layers or the number of antenna ports supported by a DMRS. However, as can be seen from FIG. 10, the number of OFDM symbols available when the extended CP is applied is smaller than the number of OFDM symbols available when the normal CP is applied and some of the OFDM symbols are pre-occupied by a PDCCH and a CRS, and thus resources necessary to increase the number of DMRS antenna ports are insufficient.

To solve the above-described problem, the present invention proposes a method of 1) using existing REs for a DMRS and adjusting an OCC length and DMRS density, 2) spreading new REs for a DMRS using existing REs for a CSI-RS, 3) spreading new REs for a DMRS using existing REs for a PDSCH or 4) spreading new REs for a DMRS using REs corresponding to a PDSCH region newly generated in an environment in which a CRS or PDCCH region is restrictively transmitted as the number of spatial layers supported by a DMRS increases. A description will be given of a DMRS pattern design scheme on the assumption of a subframe structure to which the extended CP is applied in LTE.

First Embodiment

Method of Using Existing REs for a DMRS

A method for adjusting an OCC length and DMRS density based on the number of spatial layers supported by a DMRS according to an embodiment of the present invention will now be described. In FIG. 10, DMRSs can be transmitted through a maximum of two antenna ports, that is, antenna ports #7 and #8 because a length-2 OCC is used. The number of DMRS ports can be primarily doubled using a length-4 OCC, similarly to the normal CP case (i.e. DMRSs can be transmitted through a maximum of 4 spatial layers). Furthermore, when five or more spatial layers are supported, introduction of a receiver robust to frequency selectivity can be assumed and, under this assumption, it is expected that demodulation performance of the receiver will not be affected even when DMRS frequency domain density is reduced. Accordingly, the density of REs for DMRSs can be reduced by half in the frequency domain and the number of DMRS ports can be doubled using frequency division multiplexing (FDM) resources (that is, DMRSs can be transmitted through a maximum of 8 spatial layers). A maximum of 8 DMRS ports can be supported in consideration of the above-described adjustment of the OCC length and DMRS density.

According to one embodiment, only one of primary increase and secondary increase of the number DMRS ports can be applied. When only the secondary increase scheme is applied, the OCC length need not be increased (e.g. when a maximum of 4 DMRS ports are supported) and a half of DMRS REs for a specific DMRS port(s) or specific DMRS port group in the frequency domain can be used as DMRS REs for another specific DMRS port(s) or another specific DMRS port group.

Figure 11:
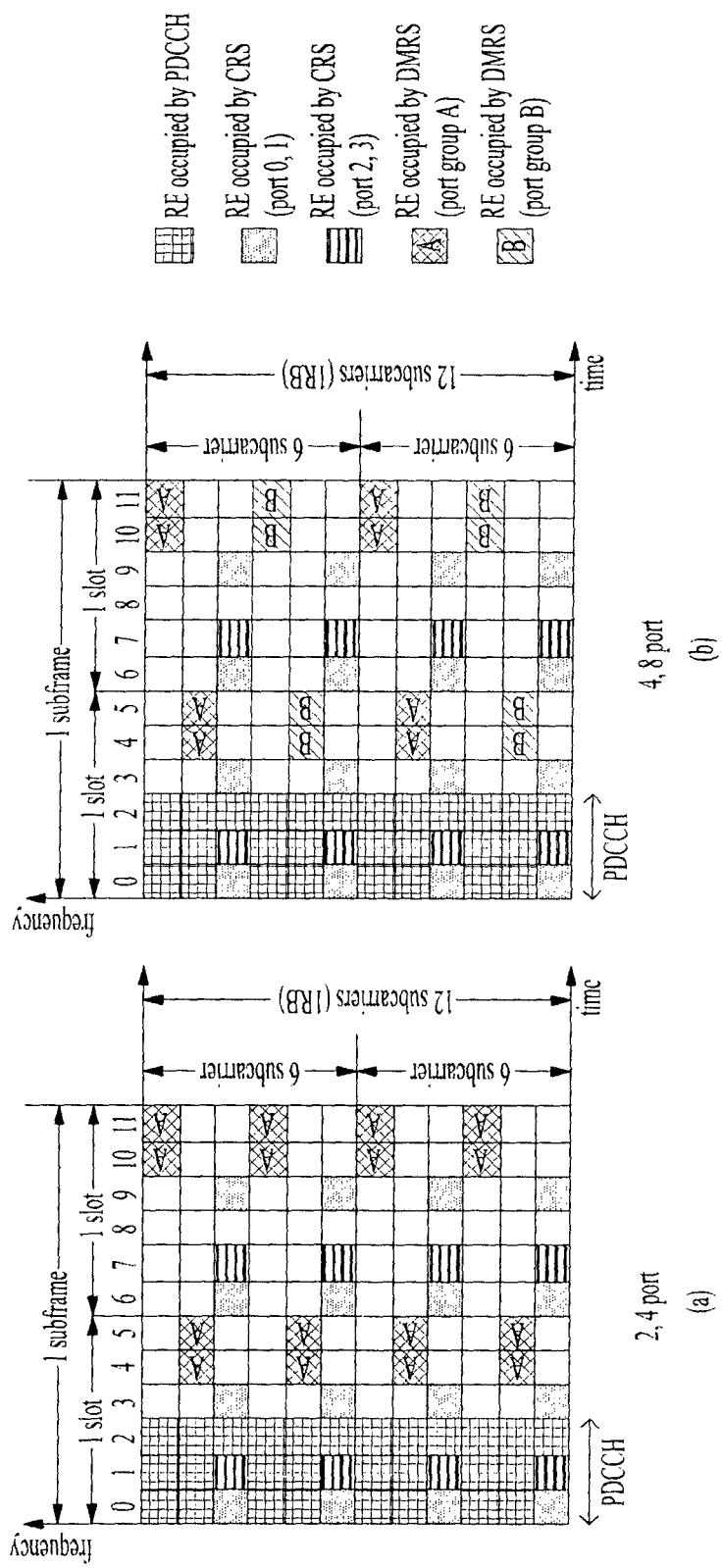
FIG. 11 illustrates a DMRS pattern of a normal downlink subframe having an extended. CP according to an embodiment of the present invention.

FIG. 11 illustrates an exemplary pattern in which an OCC length and a DMRS density have been adjusted based on the number of spatial layers supported by a DMRS. FIG. 11(a) illustrates an example in which a maximum of 4 DMRS ports is supported by increasing the OCC length while two DMRS ports are present. FIG. 11(b) illustrates an example in which frequency domain density of DMRS REs transmitted through specific DMRS port(s) (i.e. DMRS ports in a specific group) (or mapped to a specific DMRS port) is reduced by half and thus half of the REs allocated to DMRS REs are reserved and the reserved REs are allocated to DMRS REs for another specific DMRS port(s) to support a maximum of 8 DMRS ports.

Referring to FIG. 11(b), DMRS patterns of specific groups (i.e. A and B) are divided such that they have the same density in the frequency domain and the same density in the time domain.

The groups (e.g. A and B) are discriminated from each other by an OCC with length 4 and the following table shows the correspondence relationship between the groups and DMRS antenna ports #7 to #14 in FIG. 11. As shown in the following table, DMRS are transmitted through ports #7 and #8 in the case of group A when the number of DMRS ports is 2, whereas DMRSs are transmitted through ports #7, #8, #11 and #13 in the case of group A and through ports #9, #10, #12 and #14 in the case of group B when the number of DMRS ports is 4 to 8.

TABLE 7

| | Antenna port group | |
|---|---|---|
| | A | B |
| 2 ports | 7, 8 | — |
| 4 or 8 ports | 7, 8, 11, 13 | 9, 10, 12, 14 |

Second Embodiment

Method of Using REs for a CSI-RS for a DMRS

Figure 12:
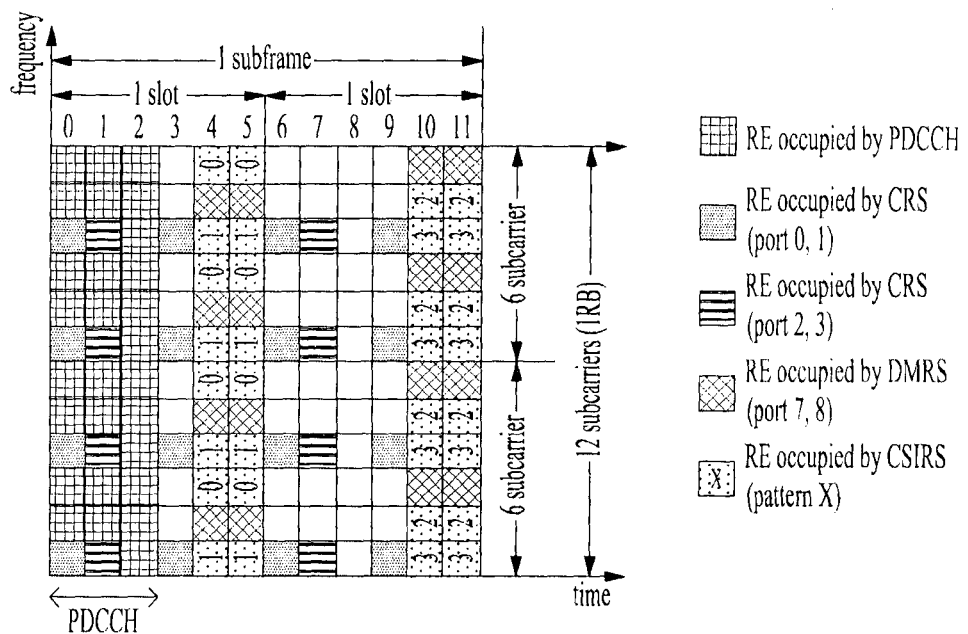
FIG. 12 illustrates a CRS pattern, a DMRS pattern and a channel state information reference signal (CSI-RS) pattern and a PDCCH region of a downlink subframe having an extended CP.

A description will be given of a method for increasing the number DMRS antenna ports using existing REs for a CSI-RS according to another embodiment of the present invention. According to another embodiment of the present invention, CSI (channel state information) is measured through a new CSI-RS in LTE Rel-10. The CSI includes a rank indicator (RI), a precoding matrix indicator (PMI), channel quality indicator (CQI), etc. and is used to transmit data to a UE in a network using MIMO. FIG. 12 illustrates a CSI-RS transmission pattern using 8 antenna ports in a subframe to which the extended CP is applied in LTE. A single CSI-RS port is discriminated by a length-2 OCC in two OFDM symbols. The CSI-RS transmission pattern may use 2 or 4 antenna ports as well as 8 antenna ports.

Here, each CSI-RS pattern (e.g. 0 to 3) can transmit CSI-RSs through 8 antenna ports. A UE receives information such as the number of antenna ports, an allocated resource region, transmit power, transmission period and offset, which correspond to CSI-RS configuration, through 'antennaPortsCount', 'resourceConfig', 'Pc' and 'subframeConfig' included in a CSI-RS-config information element of a signal of a higher layer such as an RRC. Specifically, 'antennaPortsCount' indicates the number of antenna ports used to transmit CSI-RSs, 'resourceConfig' corresponds to a CSI-RS configuration and indicates REs through which CIS-RSs are transmitted in a subframe, 'Pc' represents an assumed ratio of a CSI-RS EPRE (Energy Per Resource Element) to a PDSCH EPRE and 'subframeConfig' is a value indicating a CSI-RS transmission period and subframe offset information.

The CSI-RS is not a signal transmitted in every subframe and is transmitted in a period set by 'subframeConfig'.

To increase the number of DMRS antenna ports, a maximum number of antenna ports supported by a DMRS can be varied in a subframe specific manner according to whether or not the CSI-RS is transmitted. For example, the CSI-RS pattern is used for DMRSs to increase the maximum number of antenna ports in a subframe in which the CSI-RS is not transmitted, whereas only the existing DMRS pattern is used in a subframe in which the CSI-RS is transmitted. Here, the network can additionally inform a UE of the maximum number of DMRS antenna ports according to whether or not the CSI-RS is transmitted and/or CSI-RS information (e.g. information such as "resourceConfig", pattern information, etc.) that will be used for transmission of DMRS to be added.

Figure 13:
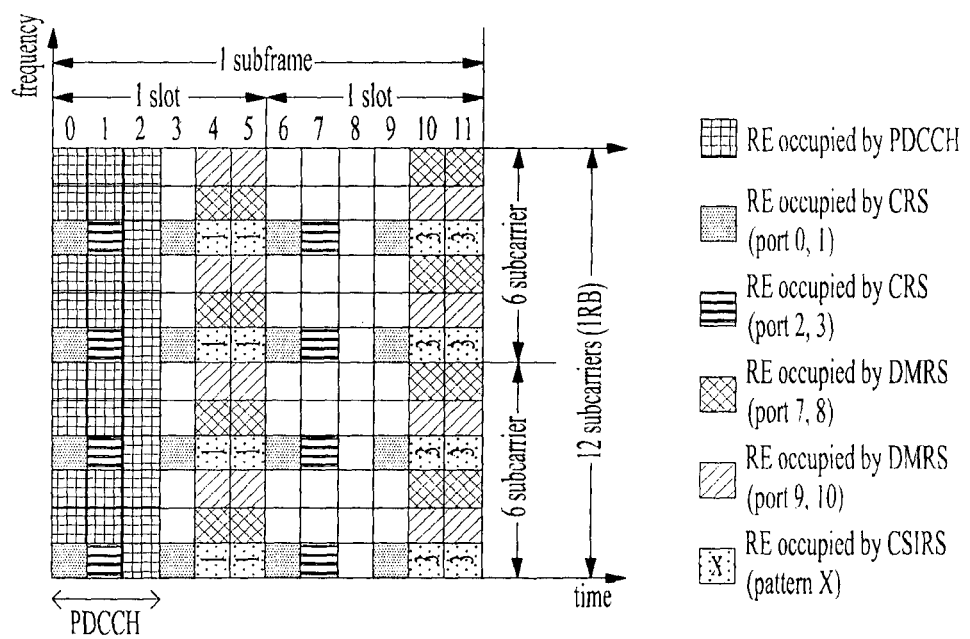
FIG. 13 illustrates a DMRS pattern of a normal downlink subframe having an extended CP according to an embodiment of the present invention.

FIG. 13 illustrates the above-described operation of the present invention and shows a DMRS pattern that supports a maximum of 4 antenna ports using CSI-RS patterns #0 and #2 as DMRS resources in a subframe in which a CSI-RS is not transmitted when a subframe in which the CSI-RS is transmitted has a DMRS pattern that supports 2 antenna ports as illustrated in FIG. 12.

Here, a length-4 OCC can be applied or the embodiment of the present invention to reduce the DMRS density in the frequency domain and secure FDM resources, described with reference to FIG. 11, can be simultaneously applied.

More specifically, in selection of DMRS resources for DMRS antenna ports (e.g. the number of antenna ports=2) to be additionally supported, a DMRS pattern for transmitting the additional DMRS resources can be selected. The DMRS pattern can be selected from the above-described CSI-RS patterns. DMRSs to be transmitted through 2 existing antenna ports and DMRSs to be transmitted through the additionally supported DMRS antenna ports can be mapped to the selected DMRS pattern and a DMRS pattern supporting the existing 2 antenna ports, that is, a total of 2 DMRS patterns.

In addition, in mapping of the DMRSs, when a length-4 OCC is applied to a DMRS sequence, the number of supportable antenna ports can be doubled compared to conventional DMRS transmission using 2 OCCs. Accordingly, when a length-4 OCC is applied, a DMRS sequence or DMRS complex modulation symbols for a maximum of 8 DMRS antenna ports can be mapped to the 2 DMRS patterns.

Additionally or alternatively, the number of supportable DMRS antenna ports can be increased by applying FDM to each DMRS pattern (i.e. by reducing density in the frequency domain direction). More specifically, each of the 2 DMRS patterns can be divided into 2 sub-patterns. Accordingly, a total of 4 DMRS sub-patterns can be obtained. Then, DMRS complex modulation symbols for an existing or added antenna port can be mapped to the sub-pattern. Here, a DMRS pattern is preferably divided into two DMRS sub-patterns such that the DMRS sub-patterns have the same frequency domain and/or time domain densities.

Figure 14:
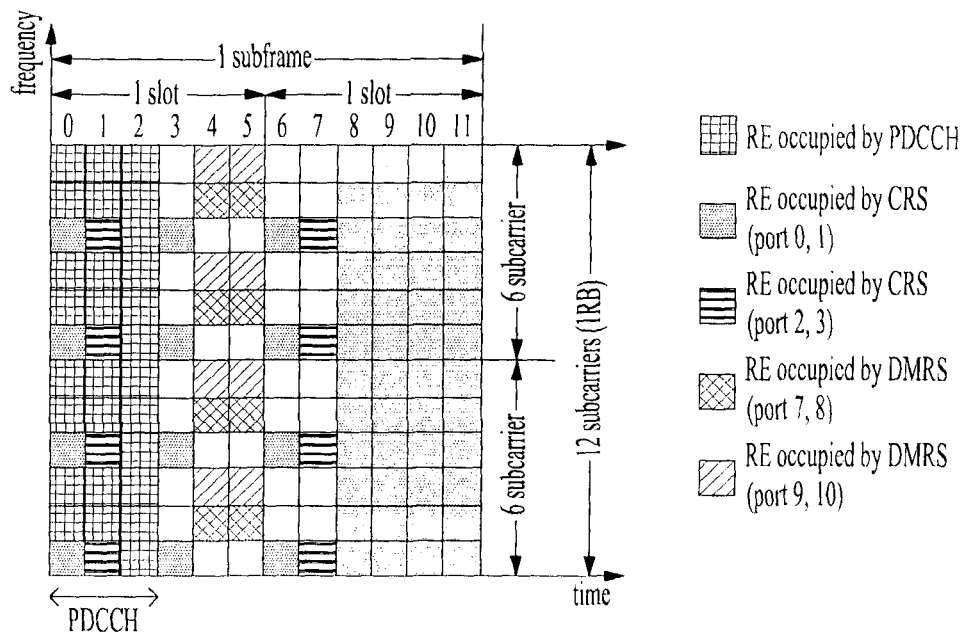
FIG. 14 illustrates a DMRS pattern of a normal downlink subframe having an extended CP according to an embodiment of the present invention.

The DMRS pattern shown in FIG. 13 can be applied in such a manner that the DMRS pattern is not transmitted after a specific OFDM symbol, as shown in FIG. 14, in a specific time division duplex (TDD) subframe, that is, DwPTS.

Third Embodiment

Method of Using Existing REs for a PDSCH for a DMRS

According to another embodiment of the present invention, a DMRS resource, whose antenna port is discriminated by a CDM resource, can be added to OFDM symbols for a PDSCH. Referring to FIG. 10, it can be confirmed that interference according to a CRS is not present in OFDM symbol #8 (i.e. the ninth OFDM symbol of a subframe). Accordingly, a method of adding a DMRS resource to the OFDM symbol can be considered.

An OCC is applied to DMRSs in 2 OFDM symbols in the time domain when the extended CP is applied. However, according to the present embodiment, it may be desirable to obtain a CDM resource by applying an OCC to 2 consecutive subcarriers in the frequency domain, as shown in FIG. 15, instead of obtaining a CDM resource in the time domain since CRS interference between neighboring OFDM symbols may be present in OFDM symbol #8.

Figure 15:
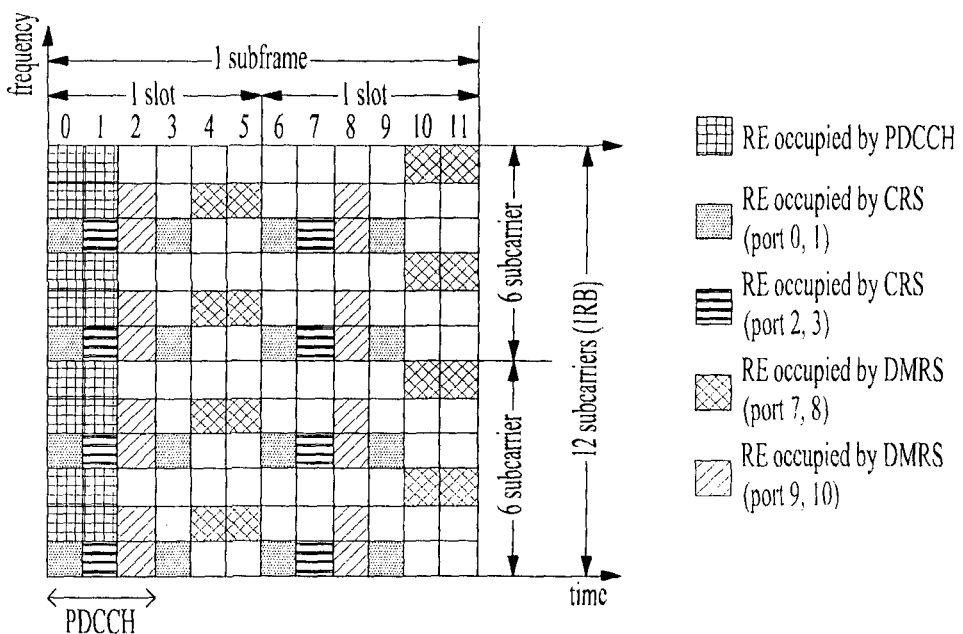
FIG. 15 illustrates a DMRS pattern of a normal downlink subframe having an extended CP according to an embodiment of the present invention.

When resources for DMRS antenna ports #9 and #10 are only added to OFDM symbol #8 in FIG. 15, a problem that time domain DMRS density corresponds to half of the time domain DMRS density with respect to DMRS antenna ports #7 and #8 can be generated. Accordingly, the length of a PDCCH region is limited to the first 2 OFDM symbols in a subframe and DMRS resources for DMRS antenna ports #9 and #10 are secured even in OFDM symbol #2 (i.e. the third OFDM symbol) according to frequency domain CDM, as shown in FIG. 15.

Here, the embodiment of the present invention, illustrated in FIG. 11, in which a length-4 OCC is applied or frequency domain DMRS density is reduced and FDM resources are secured can be simultaneously applied. When the length-4 OCC is applied, a length-2 frequency domain OCC for consecutive 2 subcarriers is applied to newly added OFDM symbols #2 and #8.

Fourth Embodiment

Method of Using REs for a CRS for a DMRS

Figure 16:
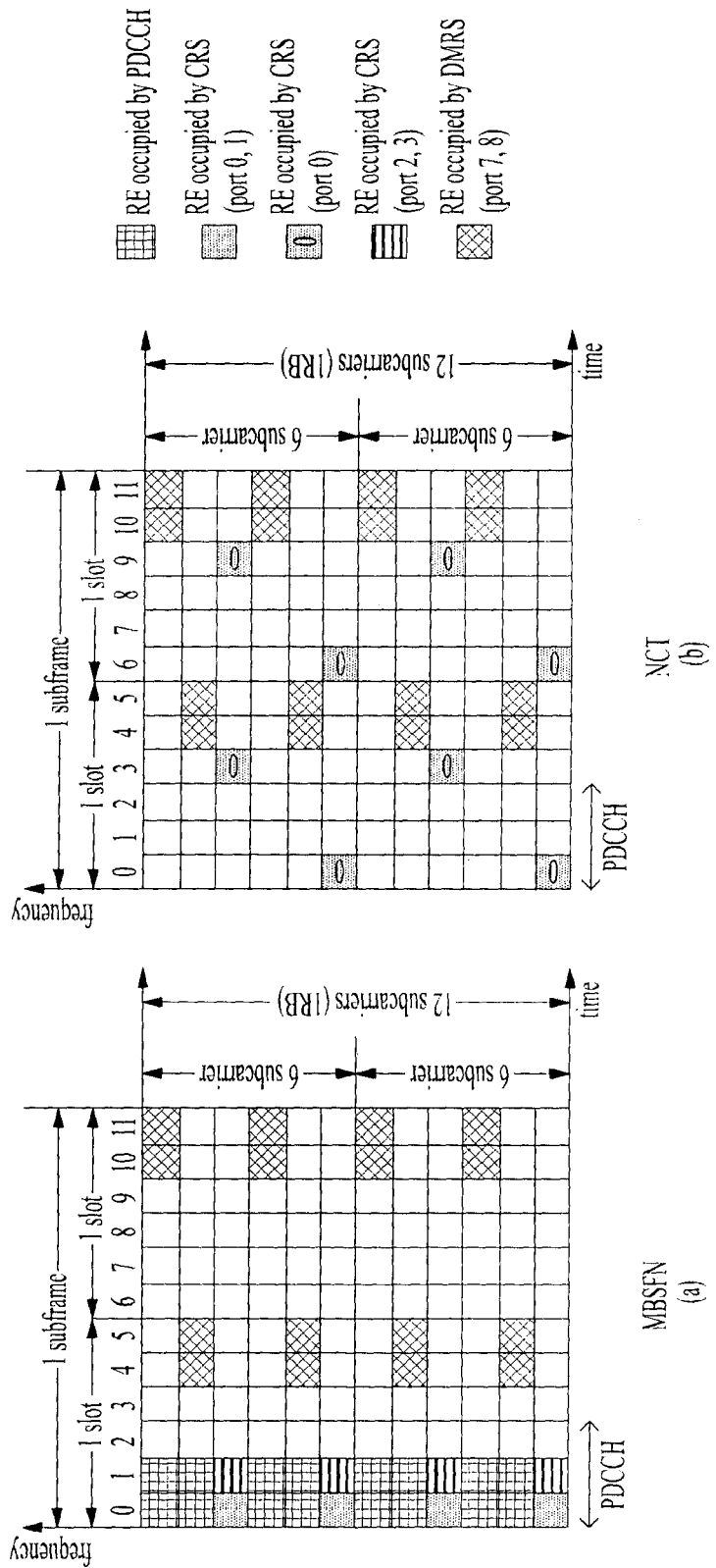
FIG. 16 illustrates CRS patterns, DMRS patterns and PDCCH regions of a multimedia broadcast single frequency network (MBSFN) subframe and a new carrier type (NCT) subframe having an extended CP.

According to an embodiment of the present invention, the number of DMRS antenna ports is increased using REs that are not allocated for CRS transmission by not transmitting a CRS through some antenna ports through which the CRS is transmitted. As shown in FIG. 10, it is difficult to use the PDCCH region and OFDM symbols #3, #6, #7 and #9 used to transmit the CRS for allocation of resources for DMRS antenna ports. However, transmission of the PDCCH region and CRS may be limited in special environments. Examples of such special environments may include an MBSFN subframe of LTE Rel-10 and NTC (new carrier type) subframe discussed in Rel-12. In the MBSFN subframe, the length of the PDCCH is limited to 2 OFDM symbols and the CRS is not transmitted in the PDSCH region. The NCT subframe is used for a secondary cell (SCell) only when carrier aggregation (CA) is employed and thus the PDCCH region is not defined and the CRS is transmitted as a synchronization signal at port #0 only at an interval of 5 ms. FIG. 16 illustrates PDCCHs and CRS patterns in the MBSFN subframe and NCT subframe.

Figure 17:
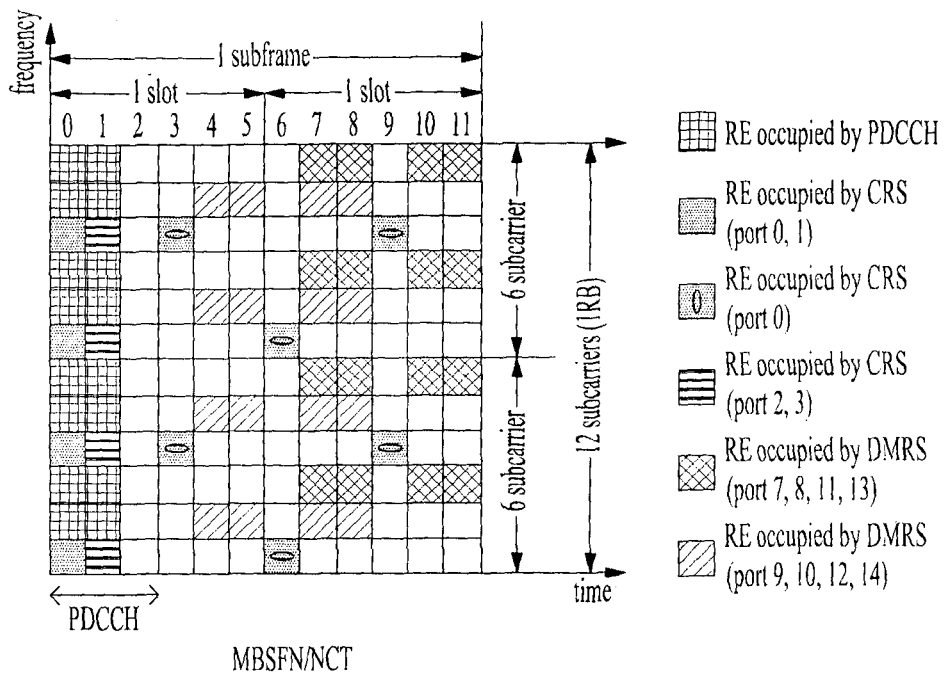
FIG. 17 illustrates a DMRS pattern of an MBSFN/NCT downlink subframe having an extended CP according to an embodiment of the present invention.

Additional DMRS resources can be allocated to OFDM symbols #2, #3, #6, #7, #8 and #9 in the case of an MBSFN subframe, whereas additional DMRS resources can be allocated to OFDM symbols #1, #2, #7 and #8 if symbols in which the CRS is transmitted are excluded in the case of NTC subframes. Accordingly, it is desirable to allocate additional DMRS resources to OFDM symbols #7 and #8 in order to set an additional DMRS pattern equally in the two cases. FIG. 17 illustrates allocation of additional DMRS resources in OFDM symbols #7 and #8.

A DMRS pattern illustrated in FIG. 17 can allocate DMRS resources to OFDM symbols #7 and #8, set the length of the OCC to 4 and support a maximum of 8 antenna ports by discriminating FDM resources.

Figure 18:
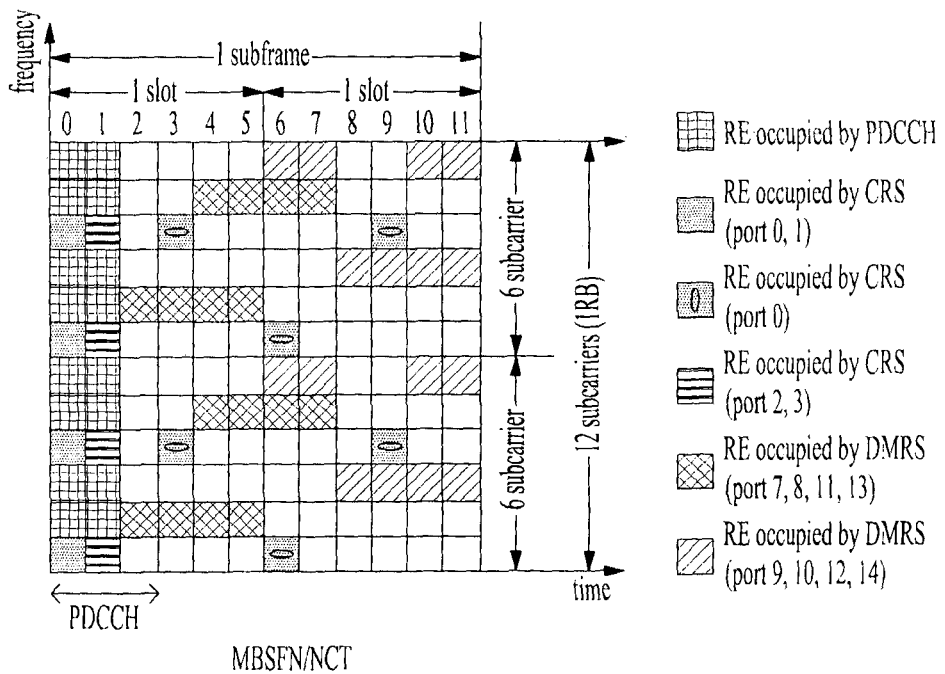
FIG. 18 illustrates a DMRS pattern of an MBSFN/NCT downlink subframe having an extended CP according to an embodiment of the present invention.

A DMRS pattern shown in FIG. 18 may be considered as another exemplary DMRS pattern. FIG. 18 illustrates a DMRS pattern considering that only CRS port #0 is used for transmission in an NCT subframe and a CRS offset has a value of 0, 1 or 2. Here, 4 REs belonging to the same subcarrier are multiplexed using a length-4 OCC to correspond to 4 DMRS ports. In addition, a maximum of 8 DMRS antenna ports can be supported by discriminating resources through FDM.

Figure 19:
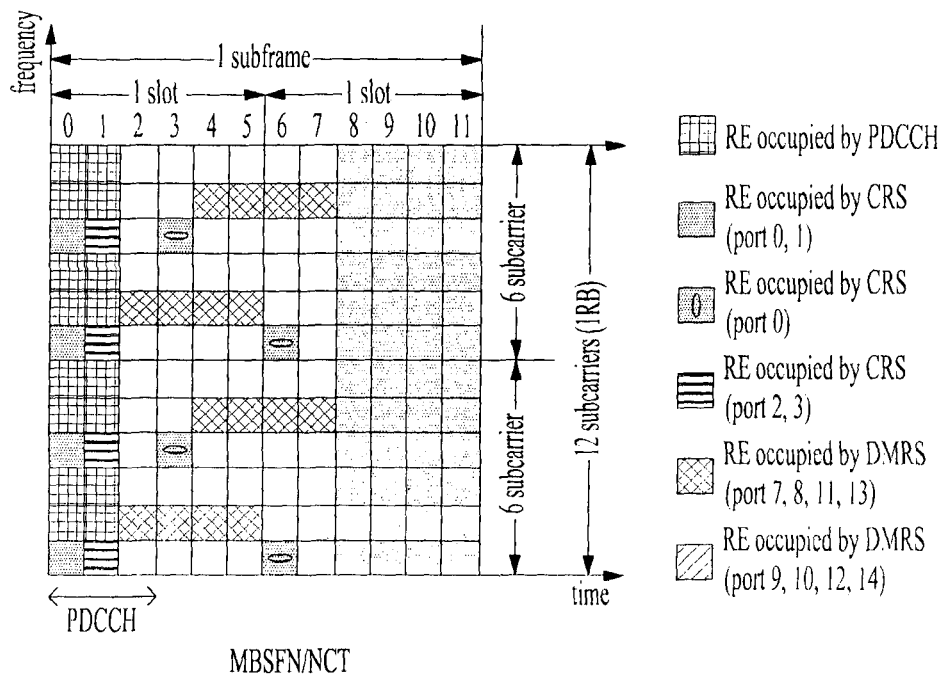
FIG. 19 illustrates a DMRS pattern of an MBSFN/NCT downlink subframe having an extended CP according to an embodiment of the present invention.

Distinguished from the pattern of FIG. 17, the pattern of FIG. 18 can support a length-4 OCC by securing additional DMRS REs even in a DwPTS of a TDD system, as shown in FIG. 19, thereby supporting a maximum of 4 DMRS antenna ports.

Figure 20:
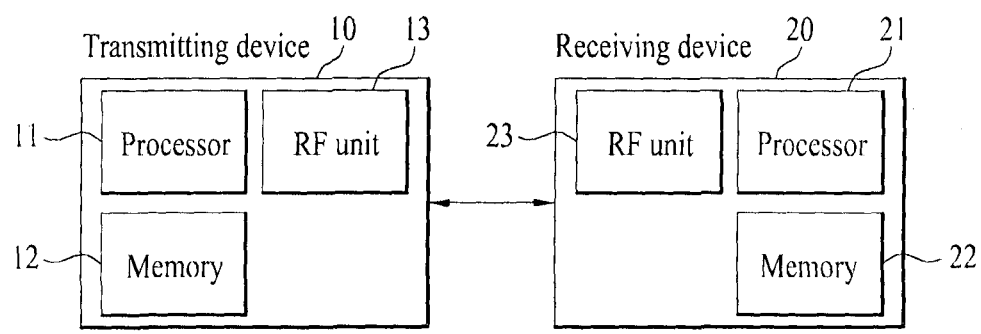
FIG. 20 is a block diagram of a device for implementing the embodiment(s) of the present invention.

FIG. 20 is a block diagram of a transmitting device 10 and a receiving device 20 configured to implement exemplary embodiments of the present invention. Referring to FIG. 20, a transmitting device 10 and a receiving device 20 respectively include Radio Frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to perform the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the exterior. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Medium Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr (where Nr is a positive integer) receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wish to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A Reference Signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on an uplink and as the receiving device 20 on a downlink. In embodiments of the present invention, an eNB or BS serves as the receiving device 20 on an uplink and as the transmission device 10 on a downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The method and apparatus for performing channel measurement in a wireless communication system according to embodiments of the present invention can be applied to a UE, a relay, a BS (eNB), or other communication devices in a wireless communication system.

The invention claimed is:

1. A method in a downlink subframe with an extended cyclic prefix (CP), in which a resource to which a first resource pattern for mapping a first demodulation reference signal (DM-RS) is configured, through a first set of antenna ports in a wireless communication system, the method for transmitting a second DM-RS which is mapped to different resources to which the first DM-RS is mapped, the second DM-RS being added to support a second set of antenna ports to a user equipment (UE), the method comprising:
  specifying subframe(s) in which a channel state information reference signal (CSI-RS) is not transmitted and positions of resources to which the CSI-RS is mapped in subframe(s) in which the CSI-RS is transmitted based on CSI-RS configuration information;
  selecting a second resource pattern for mapping the second DM-RS from among resources, corresponding to the specified positions of the resources, in the subframe(s) in which the CSI-RS is not transmitted; and
  mapping the second DM-RS to the second resource pattern in the subframe(s) in which the CSI-RS is not transmitted.

2. The method according to claim 1, further comprising transmitting the second resource pattern or CSI-RS configuration information indicating the second resource pattern to the UE.

3. The method according to claim 1, further comprising transmitting information on a number of antenna ports in the second set used to transmit the second DM-RS to the UE.

4. The method according to claim 1, wherein the selecting of the second resource pattern comprises selecting a resource having a subcarrier index different from a subcarrier index of a resource to which a cell-specific reference signal is allocated.

5. The method according to claim 1, wherein the mapping of the second DM-RS comprises applying a length-4 orthogonal cover code (OCC) to complex-valued modulation symbol(s) for the first DM-RS and complex-valued modulation symbol(s) for the second DM-RS in a direction of a time domain.

6. The method according to claim 1, wherein the second resource pattern is composed of as many resource elements as a number of resource elements constituting the first resource pattern.

7. The method according to claim 1, wherein the mapping of the second DM-RS comprises:
  dividing each of the first resource pattern and the second resource pattern into a first sub-pattern and a second sub-pattern; and
  mapping a complex-valued modulation symbol for the first DM-RS to the first sub-pattern of the first resource pattern;
  mapping a complex-valued modulation symbol for a third DM-RS, transmitted through a third set of antenna ports having as many antenna ports as a number of antenna ports in the first set, to the second sub-pattern of the first resource pattern,
  mapping a complex-valued modulation symbol for the second DM-RS to the first sub-pattern of the second resource pattern; and
  mapping a complex-valued modulation symbol for a fourth DM-RS, transmitted through a fourth set of antenna ports having as many antenna ports as a number of antenna ports in the second set, to the second sub-pattern of the second resource pattern,
  wherein the first resource pattern is divided into the first sub-pattern and the second sub-pattern such that the first sub-pattern and the second sub-pattern have a same frequency domain density and the second resource pattern is divided into a first sub-pattern and a second sub-pattern such that the first sub-pattern and the second sub-pattern of the second resource pattern have a same frequency domain density.

8. The method according to claim 1, wherein the second resource pattern includes at least one of resource element (RE) pairs positioned at $(3x+k', 4)$ and $(3x+k', 5)$ in each slot of a physical resource block (PRB) pair in the subframe, wherein $x=0, 1, 2$ and $3$, $k'=0$ or $2$ if $n_s$ mod $2=0$, $k'=0$ or $1$ if $n_s$ mod $2=1$, $n_s$ denotes a slot index, and $(m, n)=$(subcarrier index, orthogonal frequency division multiplexing (OFDM) symbol index) in each slot of the PRB pair.

9. A method in a downlink subframe with an extended cyclic prefix (CP), in which a resource to which a first resource pattern for mapping a first demodulation reference signal (DM-RS) is mapped is configured, through a first set of antenna ports in a wireless communication system, the method for receiving a second DM-RS which is mapped to different resources to which the first DM-RS is mapped, the second DM-RS being added to support a second set of antenna ports, the method comprising:

receiving the second DM-RS on a resource corresponding to a second resource pattern, wherein the second resource pattern is selected for mapping the second DM-RS from resources, corresponding to positions of the resources, in subframe(s) in which a channel state information reference signal (CSI-RS) is not transmitted, and wherein the subframe(s) in which the CSI-RS is not transmitted and the positions of the resources to which the CSI-RS is mapped in subframe(s) in which the CSI-RS is transmitted are specified based on CSI-RS configuration information.

10. An evolved Node-B (eNB), in a downlink subframe with an extended cyclic prefix (CP), in which a resource to which a first resource pattern for mapping a first demodulation reference signal (DM-RS) is mapped is configured, through a first set of antenna ports in a wireless communication system, the eNB configured to transmit a second DM-RS which is mapped to different resources to which the first DM-RS is mapped, the second DM-RS being added to support a second set of antenna ports to a user equipment (UE), the eNB comprising:

a memory; and a processor connected to the memory and configured to:

specify subframe(s) in which a channel state information reference signal (CSI-RS) is not transmitted and positions of resources to which the CSI-RS is mapped in subframe(s) in which the CSI-RS is transmitted based on CSI-RS configuration information, select a second resource pattern for mapping the second DM-RS from among resources, corresponding to the specified positions of the resources, in the subframe(s) in which the CSI-RS is not transmitted, and map the second DM-RS to the second resource pattern in the subframe(s) in which the CSI-RS is not transmitted.

11. A user equipment (UE), in a downlink subframe with an extended cyclic prefix (CP), in which a resource to which a first resource pattern for mapping a first demodulation reference signal (DM-RS) is mapped is configured, through a first set of antenna ports in a wireless communication system, the UE configured to receive a second DM-RS which is mapped to different resources to which the first DM-RS is mapped, the second DM-RS being added to support a second set of antenna ports, the UE comprising:

a memory; and a processor connected to the memory and configured to:

receive the second DM-RS on a resource corresponding to a second resource pattern, wherein the second resource pattern is selected for mapping the second DM-RS from among resources, corresponding to positions of the resources, in subframe(s) in which a channel state information reference signal (CSI-RS) is not transmitted, and wherein the subframe(s) in which the CSI-RS is not transmitted and the positions of the resources to which the CSI-RS is mapped in subframe(s) in which the CSI-RS is transmitted are specified based on CSI-RS configuration information.

* * * * *